Oct. 25, 1955  K. D. RAINSBERG  2,721,481
GRAVITYMETER
Filed March 31, 1953
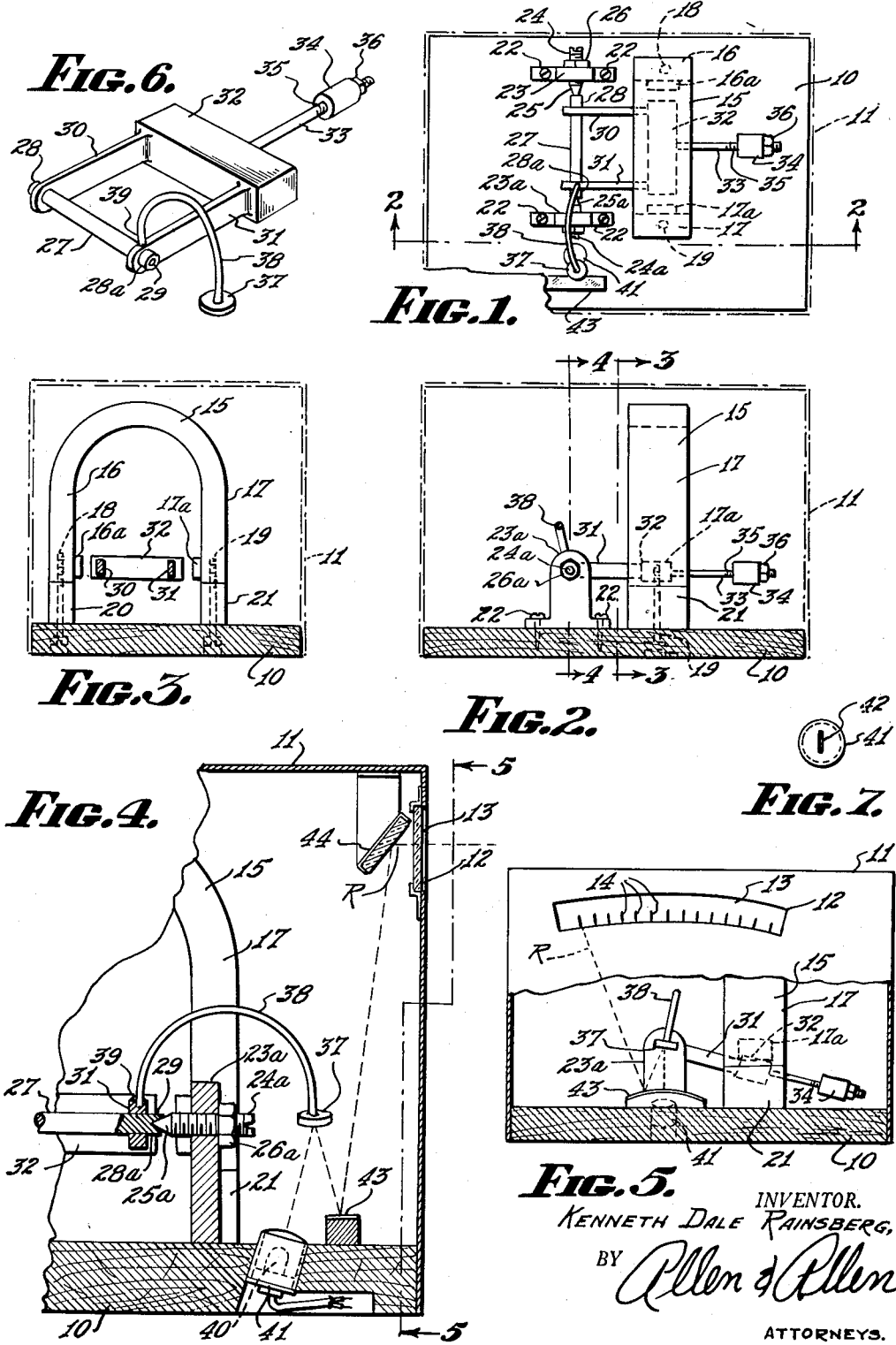
INVENTOR.
KENNETH DALE RAINSBERG,
BY Allen & Allen
ATTORNEYS.

United States Patent Office 2,721,481
Patented Oct. 25, 1955

2,721,481

GRAVITYMETER

Kenneth D. Rainsberg, New Philadelphia, Ohio

Application March 31, 1953, Serial No. 346,648

2 Claims. (Cl. 73—382)

This invention relates to gravitymeters. More specifically the invention relates to gravitymeters of the type wherein a resiliently suspended weight is adapted to actuate an indicating means, the position of the weight and consequently that of the indicating means being dependent upon the stress of the resilient suspension as caused by the earth's gravitational attraction for the weight at whatever particular position the device is observed.

As well known the earth's gravitational attraction for a weight or mass varies inversely as the square of the distance from the center of the earth to the center of gravity of the weight. Thus a gravitymeter may readily be adapted to serve as an altimeter, the indicating means or dial being graduated in increments representing altitudes.

It will readily be understood that due to the extremely small variations of the forces involved an instrument of this type must of necessity be one possessing extreme sensitivity if it is to function in a satisfactory manner. Thus the device should preferably have a minimum number of moving parts which are precisely balanced and mounted by a means offering absolute minimum frictional resistance to movement of the parts.

With the above considerations in mind it is a principal object of my invention to provide an improved gravitymeter particularly suitable for use as an altimeter, the improved device possessing extreme sensitivity and having a minimum number of moving parts characterized by an absolute minimum of frictional resistance.

Another object of my invention is to provide a gravitymeter comprising a resiliently suspended weight wherein the resilient means suspending the weight comprises a magnetic field, thus obviating objections due to friction, temperature variations and other defects inherent in all resilient mechanical suspensions.

Another object of my invention is to provide a simple and effective guide means whereby the weight is positively guided in its movements with respect to its supporting magnetic field.

A further object of my invention is to provide a counterbalanced arrangement of the movable parts whereby friction of the guide means is reduced to an absolute minimum.

Still another object of my invention is to provide a simple and frictionless means comprising a light beam for visually indicating the relative positions of the weight, the light beam also being unaffected by temperature variations.

Yet another object of my invention is to provide indicating means including a convex mirror whereby movements of the parts as indicated by the light beam will be magnified.

Other objects and advantages of my invention will be apparent to the skilled worker in the art with an understanding of the ensuing description.

Referring now to the drawings wherein like numerals are employed to designate like parts throughout the various figures:

Figure 1 is a plan view illustrating a preferred embodiment of my improved gravitymeter, certain parts not pertinent to the invention being omitted and a casing being indicated by broken lines.

Figure 2 is a vertical sectional view thereof, the view being taken on the line 2—2 of Figure 1.

Figure 3 is a vertical sectional view taken along the line 3—3 of Figure 2.

Figure 4 is an enlarged sectional view taken along the line 4—4 of Figure 2.

Figure 5 is a front elevational view partly in section, the view being on a reduced scale and taken along the line 5—5 of Figure 4.

Figure 6 is a perspective view showing a sub-assembly of parts comprising the movable elements of the device, and Figure 7 is a front view of a light source which may be employed to produce a narrow beam of light.

As illustrated in the figures of the drawings, a preferred embodiment of my improved device comprises a base 10 and a suitable casing 11 which protects the inner mechanism. The base 10 and casing 11 will preferably be formed from a metal suitable for shielding the inner mechanism from undesired magnetic influences. It will be obvious that the assembly of these parts may comprise an air tight closure serving to exclude dust and moisture, suitable fastening and sealing means herein not shown but which may be employed for this purpose being well known and forming no part of this invention.

The casing 11 has a window or opening 12 revealing a dial 13 suitably graduated as indicated at 14 in increments as may be required for any specific use of the instrument. The dial 13 will preferably be formed from translucent material such as ground glass so that a light ray, such as the ray R, impinging on the rear of the dial is clearly visible to an observer positioned in front of the dial.

As most clearly shown in Figures 2 and 3, a permanent magnet 15 of the horseshoe type having legs 16 and 17 is fastened to the base 10 by means of screws or the like 18 and 19, suitable spacing blocks 20 and 21 of non-magnetic material being interposed between the lower ends of the legs and the base 10, the spacing blocks serving principally to elevate the magnet from the base.

The lower ends of the legs 16 and 17 as shown are respectively provided with inwardly disposed extensions 16a and 17a which comprise the magnetic poles of the magnet and, as shown, may be of reduced cross sectional area so as to concentrate the magnetic flux or lines of force existing between the poles. The magnet 15 will preferably be of the type having high magnetic qualities such as the "Alnico" magnets well known to those skilled in the art.

Fixed to the base 10 by screws, generally indicated at 22, are a pair of supporting elements or brackets 23, 23a each adapted to mount threaded screws comprising adjustable trunnion pins 24, 24a having conical ends or tips 25, 25a and provided with lock nuts 26, 26a.

For guiding the movable parts of the device, a rod 27 is provided having its opposite ends 28, 28a suitably machined, as at 29 (Figure 4) to permit trunnioned mounting of the rod between the conical tips 25, 25a of the screws 24, 24a. The trunnioned mounting may comprise jewelled bearings or the like to further reduce friction. Fixedly attached to the rod 27 are a pair of arms 30 and 31 mounting a weight 32 which weight may be of any magnetic metal suitable for coaction with the magnet 15. However, it is preferred that the weight 32 comprises a magnet of the type hereinbefore mentioned and having high magnetic qualities.

Fixed to the weight or magnet 32 is an extending rod 33 carrying a smaller weight 34 at its free end. The weight 34 functions as a counterweight and for this purpose it will p
rod 33. Mai
will readily o
parting from
adjustable pur
be threaded, a
locknut 36 be
As best seer
tion of the pa
between the p
poles of the 
whereby the 
and its associ
It is to be
suspension of
ing is provide
movable parts
with proper
balance the c
and 31 an ab
the trunnion
nioned mount
it will now b
as guide mea
tween the po
be understoo
tween the pc
comprise a c
the device. 
magnetic gap
sensitivity of
A small m
ed by means
at 39, the pl
the rod 27.
mirror and i
balanced by
arm 30 sligh
a small porti
the weight o
Fixedly m
herein show
40 arranged
in Figure 7,
well known i
or slit of foc
of the apertu
the cross sec
readily be o
desired.
Referring
by the sourc
is reflected t
10. The mi
mirror 44 w
onto the rea
ence to Figu
43 is convex
thereon by
pinges on th
sweep of th
may readily
scope of the be ex-
net or
osition
at sea
e posi-
in the
respect
10.
des or
agnetic
ion of
xtreme
it with
osition n con-
means
mount-
to de-
accord-
nd the ention,
eferred
in the
dily be
of the desire -shaped
ng ver-
e, pivot
the legs
id pivot
magnet,
naterial
ined by
s piece
in, and
id arm -shaped
ng ver-
d base,
magnet,
and ex-
includ-
he pole
tic field,
ss piece
for re-
ence of 7, 1922
24, 1937
8, 1944
0, 1951